US006700621B1

(12) United States Patent
Seo (10) Patent No.: US 6,700,621 B1
(45) Date of Patent: Mar. 2, 2004

(54) DIGITAL CAMERA WITH PIVOTABLE COVER

(75) Inventor: Shuzo Seo, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/309,890

(22) Filed: May 11, 1999

(30) Foreign Application Priority Data

May 13, 1998 (JP) .......................... P10-130045

(51) Int. Cl.⁷ .................... H04N 5/225; H04N 5/222
(52) U.S. Cl. ................. 348/375; 348/333.06; 348/373; 348/374; 348/376
(58) Field of Search ................. 348/333.01, 333.06, 348/333.08, 333.13, 373, 374, 375, 376, 333.11; D16/212, 213, 229, 211; H04N 5/225, 5/222

(56) References Cited

U.S. PATENT DOCUMENTS

| | | | | |
|---|---|---|---|---|
| 5,982,429 A | * | 11/1999 | Kamamoto et al. | .... 348/333.06 |
| 6,067,116 A | * | 5/2000 | Yamano et al. | ............. 348/372 |
| 6,339,447 B1 | * | 1/2002 | Kurahashi et al. | ............ 348/96 |
| 2002/0191096 A1 | * | 12/2002 | Tanaka et al. | ......... 348/333.06 |

* cited by examiner

Primary Examiner—Wendy R. Garber
Assistant Examiner—Justin Misleh
(74) Attorney, Agent, or Firm—Greenblum & Bernstein, P.L.C.

(57) ABSTRACT

A digital camera for electrically photographing an image, which includes an electrical photography unit and a display unit having a liquid crystal display (LCD). The display unit is disposed in a camera body and the electrical photography unit is disposed in a swing cover attached to the body. The swing cover is rotatable between an angle of complete closure of the LCD and an angle of disclosure of the LCD.

13 Claims, 8 Drawing Sheets

DIGITAL CAMERA WITH PIVOTABLE COVER

BACKGROUND OF THE INVENTION

1. Field of the Invention

The present invention relates to a digital camera that includes a liquid crystal display (LCD) for displaying an image to be photographed.

2. Description of the Related Art

A digital camera is known that includes a display unit containing a liquid crystal display (LCD) for displaying an image to be photographed. The display unit is movably attached to a body of the digital camera such that a photographer can view the image at a convenient angle.

The conventional digital camera is sometimes troublesome for the photographer, because an angle and position of the display unit has to be adjusted. Disadvantageously, a surface of the LCD easily attracts particulate matter, for example, finger smudges and dust, during the adjustment, and no protection is provided for the LCD to prevent accumulation of particulate matter during photography.

SUMMARY OF THE INVENTION

Therefore, an object of the present invention is to provide an uncomplicated, easily adjustable LCD display unit on a digital camera, which is protected from accumulation of particulate matter.

A digital camera according to the present invention comprises an electrical photography unit that includes an image sensor converting an optical image to an electrical image, and an optical system focusing the optical image on an image receiving surface of the image sensor, a display unit that has a liquid crystal display (LCD) displaying the electrical image on the LCD, a camera body having a front surface in which the display unit is disposed, and a swing cover attached to the camera body that rotates between a closed position that completely covers the LCD and an open position that discloses the LCD. The electrical photography unit is disposed in the swing cover.

BRIEF DESCRIPTION OF THE DRAWINGS

The present invention will be better understood from the description of the preferred embodiments of the invention set forth below together with the accompanying drawings, in which.

DESCRIPTION OF THE PREFERRED EMBODIMENT

Hereinafter, the preferred embodiments of the present invention are described with reference to the attached drawings.

Figure 1:
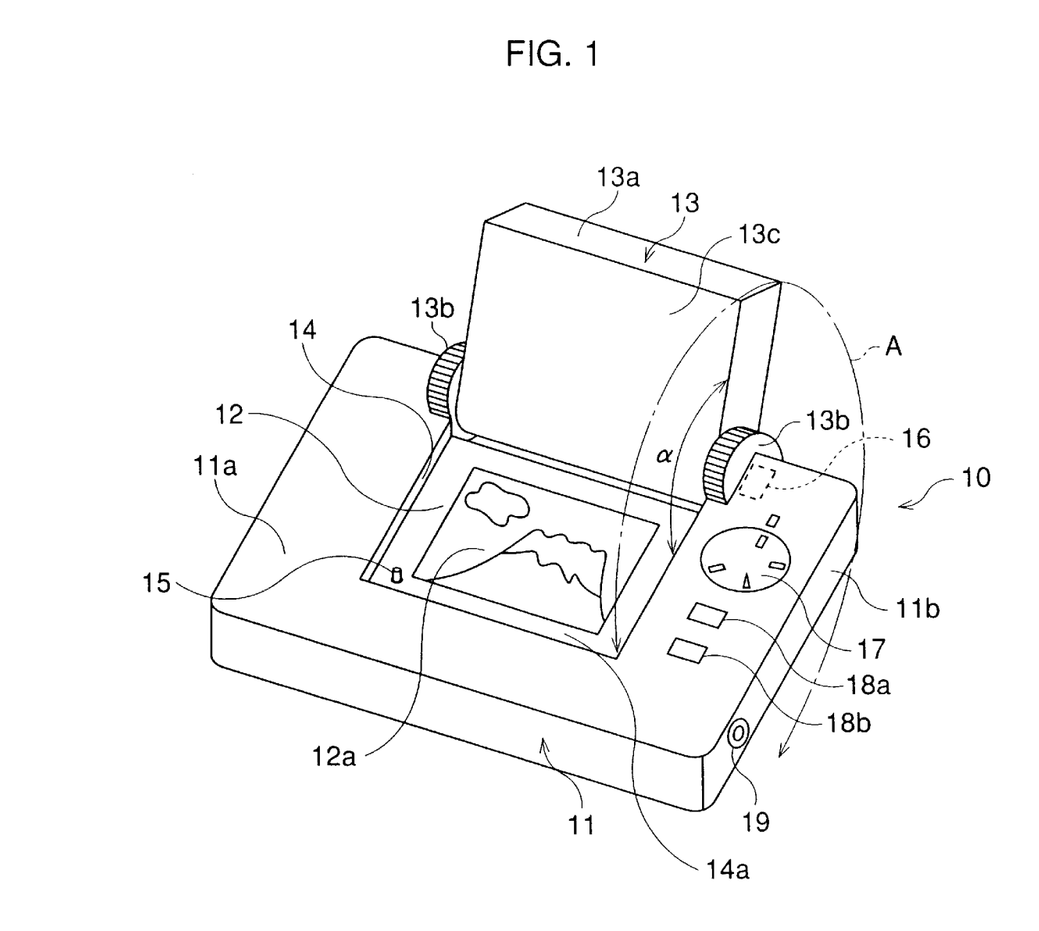
FIG. 1 is a perspective view showing a first embodiment of a digital camera according to the present invention displaying an LCD.

FIG. 1 is a perspective view showing a first embodiment of a digital camera according to the present invention. The digital camera 10 includes a body 11 having a shape of a substantially rectangular plate, a display unit 12 having a rectangular liquid crystal display (LCD) 12a disposed in the body 11, such that the LCD 12a is positioned at a center of a top surface 11a of the body 11. A swing cover 13 is positioned at an upper end of the body 11 to pivot around an axis adjacent and parallel to an upper edge of the LCD 12a. The swing cover 13 is a rectangular plate corresponding to the shape of the LCD 12a and is swingable in an angular range shown by a single-chained line A in FIG. 1. An angle α of the cover 13 can be changed between a minimum angle (0 deg) where the swing cover 13 is closed to completely cover the LCD 12a and a maximum angle (270 deg) where the LCD 12a is completely disclosed. The cover 13 has a back surface 13c and a front surface 13d (see FIG. 2), and the back surface 13c faces the LCD 12a when the LCD 12a is covered by the cover 13.

An electrical photography unit 20 (shown in FIGS. 2 and 3) is disposed in the cover 13 for electrically photographing an image which is displayed by the display unit 12 on the LCD 12a.

Figure 2:
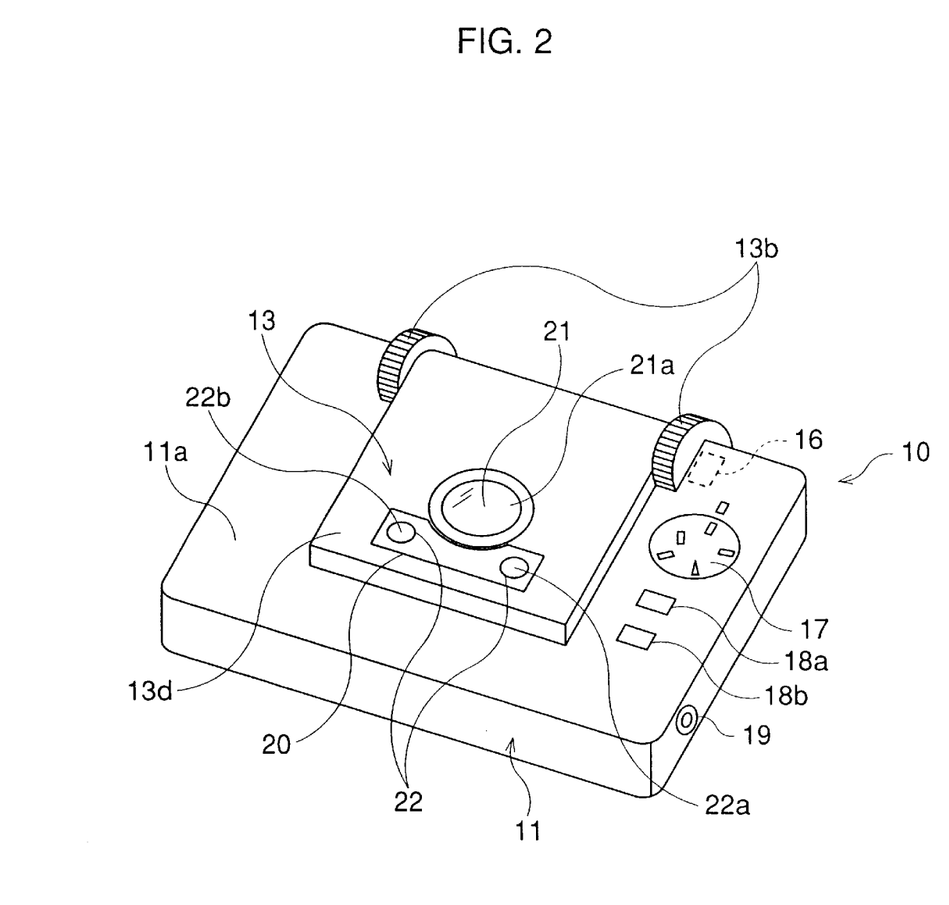
FIG. 2 is a perspective view of the first embodiment with the LCD covered.

In FIG. 2, when the cover 13 completely covers the LCD 12a, an electrical power of the digital camera 10 is turned OFF such that the digital camera is shut down. A recess 14 (FIG. 1), having low tolerance dimensions to smoothly receive the cover 13 is formed on the top surface 11a of the body 11 at the position of the LCD 12a, such that the bottom (i.e., back) surface 13c of cover 13 is received below the top surface 11a of the body 11 when the cover 13 is completely closed, allowing optimum protection of the LCD 12a. A switch 15, (FIG. 1) exhibiting a closed state during camera operation, is disposed on a bottom surface 14a of the recess 14 adjacent to a lower edge of the LCD 12a. When the cover 13 is completely closed over the LCD 12a, a portion of the bottom surface 13c of the cover 13, corresponding to the switch 15 and adjacent a bottom side surface 13a (FIG. 1), depresses the switch 15, thus shutting down the digital camera 10. When the cover 13 is again opened, disclosing (i.e., uncovering), the LCD 12a (FIG. 1), the switch 15 is released, entering an ON state, and allowing an electrical power to be supplied to the digital camera 10. The switch 15 is used as a main power switch. Since the power supply is automatically stopped by depressing the switch 15, unexpected power consumption due to carelessness is prevented once the cover 13 is closed.

Since the photographing angle is selected by the angle α of the cover 13 (FIG. 1) pivoting around the body 11, and the display unit 12 is fixed in the body 11, the position and angle a of the display unit 12 is directly and easily adjustable by moving the body 11, and the LCD 12a does not accumulate particulate matter, such as finger-smudges. Further, the LCD 12a (FIG. 1) is protected from particulate matter and damage due to the cover 13 when the digital camera 10 is shut down.

A pair of cylindrical dials 13b are fixed to the cover 13, coaxial to and at opposite ends of the swing axis of the cover 13. A plurality of axial grooves are formed on a circumference of the dials 13b for an increased frictional engagement with a finger of a photographer. The cover 13 can be easily rotated by twisting one or both of the dials 13b. A rotary switch 16, driven by the rotation of the dial 13b, is mechanically connected to one of the dials 13b for detecting the angle α of the cover 13.

A mode selection switch 17 is disposed on the top surface 11a of the body 11, for selecting a switch-controlled operation mode of the digital camera 10. Direction buttons 18a and 18b are disposed on the top surface 11a of the body, for adjusting a luminance of the LCD 12a (FIG. 1) and for controlling forward and backward feeding of images photographed. When the upper button 18a is pushed, the luminance is increased or the images are fed forwards. When the lower button 18b is pushed, the luminance is decreased or the images are fed backwards. An input/output terminal 19 is disposed on a side surface 11b of the body 11, for externally outputting a photographed image to a personal computer (not shown) or other peripheral apparatus, and for inputting an image from such an apparatus to the digital camera 10. Due to a majority of people being right-handed, the mode selection switch 17 and the dection buttons 18a and 18b are positioned on a right side portion of the top surface 11a.

Figure 3:
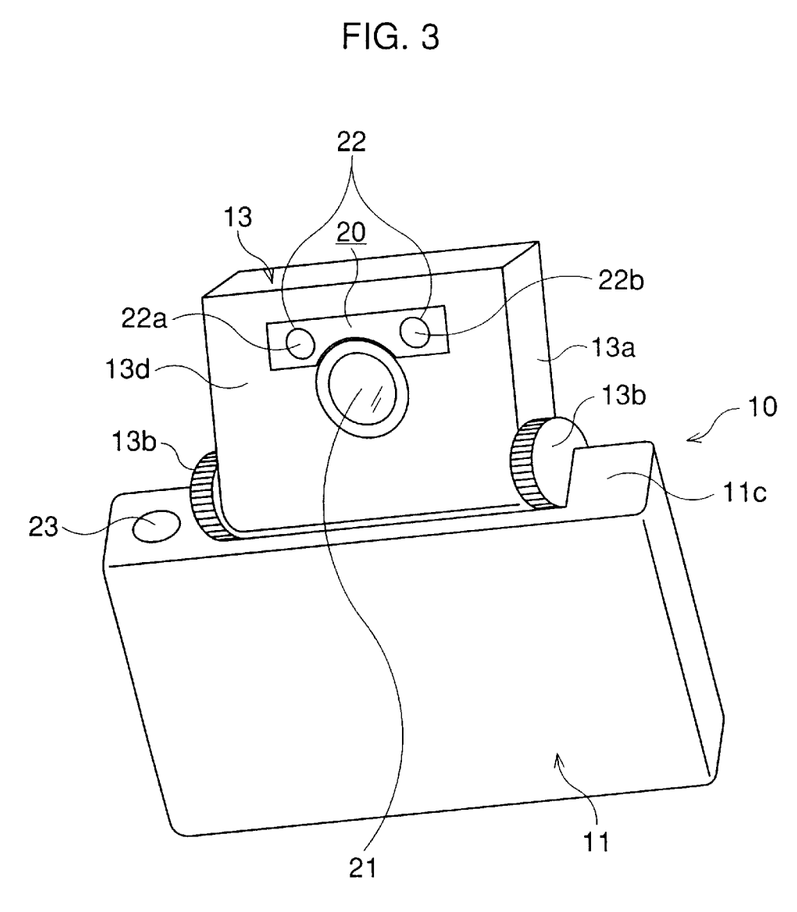
FIG. 3 is a perspective bottom view of the first embodiment with an open cover.
Figure 6:
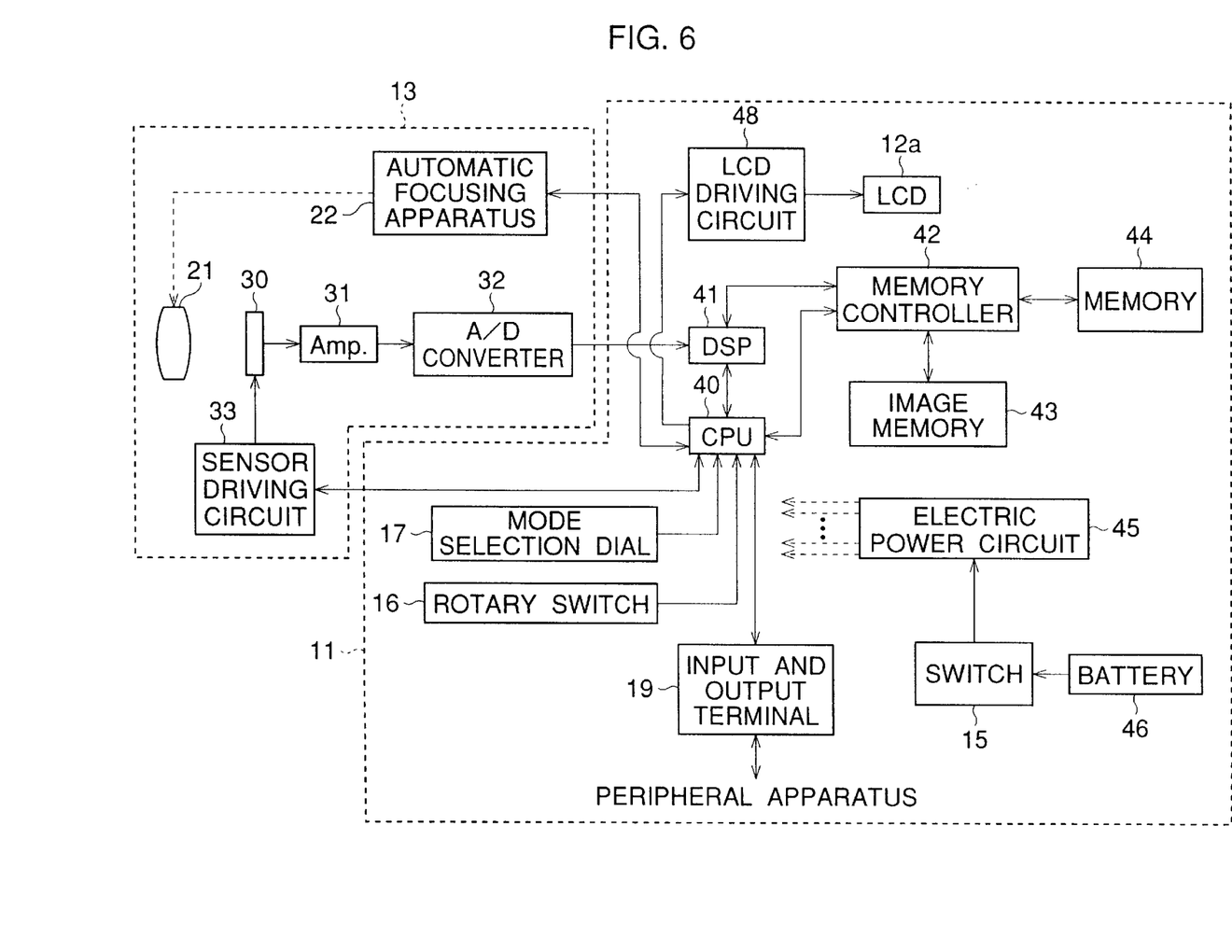
FIG. 6 is a block diagram of the first embodiment.

As shown in FIG. 3, the cover 13 is wide open for photographing an image. In this state, the display unit 12 is fully disclosed to the photographer. The cover 13 projects from the upper end of the top surface 11a of the body 11. The electrical photography unit 20 includes an optical system 21 and an image sensor 30 (shown in FIG. 6), for optically focusing an image on a visual field of the image sensor 30, which then converts the focused image to electrical image-pixel signals. The image sensor 30 is preferably an area sensor. An automatic focusing apparatus 22 is disposed in the optical system 21, and includes a light-emitting diode 22a and a photo-sensor 22b. The automatic focusing apparatus 22 measures a distance from the digital camera 10 to an object, in a well-known manner. A lens 21a (FIG. 2), being part of the optical system 21, is disposed on the front surface 13d for focusing a visual field on the image sensor 30. The cover 13 is designed to have a thickness sufficient to include the optical system 21 within the cover 13 and to allow the front surface 13d to be completely flat. However, a modification allows the lens 21a of the optical system 21 to project from the front surface 13d of the cover 13, whereby the cover 13 is made thinner. A shutter button 23 is disposed on a top side surface 11c of the body 11 for driving both a shutter (not shown) of the optical system 21 and a memory controller 42 (FIG. 6: described later).

Figure 4:
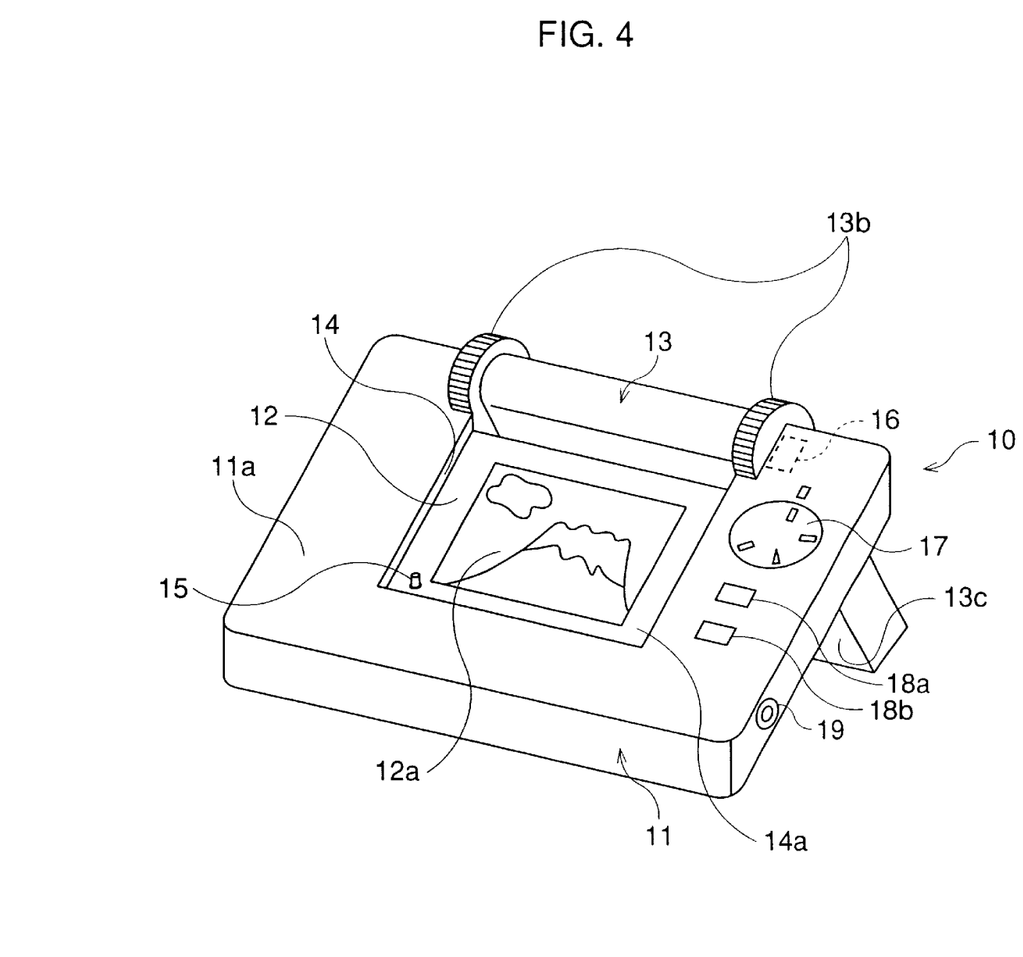
FIG. 4 is a perspective view of the first embodiment with the cover opened to a maximum angle.

As shown in FIG. 4, when the cover 13 is swung open to the maximum angle of 270 deg, the cover 13 projects obliquely downward from a bottom surface of the body 11, and the LCD 12a faces upward. In this position, the digital camera 10 may be positioned on a flat surface, such that photographed images may be scrolled through at leisure by a photographer. Thus, it is unnecessary to hold the body.

A cover-controlled operation mode of the digital camera 10 is changed in response to an angle a of the cover 13, as shown in the following table 1:
Table 1 Cover-controlled Operation Modes Selected by the Swing Cover 13:

| Angle α | Operation Mode | Operation |
| --- | --- | --- |
| α = 0 | Shutdown | Power off |
| 0 < α < 210 | Photography | 1) Input image is displayed in real-time before photographed. Photographing is possible. 2) Photographed image is displayed. |
| 210 < α < 270 | Slide | Photographed still images are displayed frame by frame. |

In the "Shutdown" mode, the electrical power of the digital camera 10 is off, as mentioned previously.

In the "photography" mode, an image input to the electrical photography unit 20 is displayed by the display unit 12 in real-time as a moving image. The photographer can observe and confirm the image to be photographed. When the shutter button 23 is pushed, an image of one frame of the moving image is photographed and the photographed image is displayed on the LCD 12a as a still image.

In the "Slide" mode, the photographed still image is displayed. When a plurality of still images have been photographed, the photographer can select the images frame by frame using the direction buttons 18a and 18b, similar to a conventional slide projector. When the button 18a is pushed, the slides are forwarded toward a most recent image, and when the button 18b is pushed, images going back in chronological order are successively displayed.

The mode selection switch 17 manually selects switch-controlled operation modes, as shown in table 2:
Table 2 Switch-controlled Operation Modes Selected by the Mode Selection Switch 17:

| Operation Mode | Mode selected by swing cover 13 | Operation |
| --- | --- | --- |
| Delete | "Slide" | Photographed image is deleted. |
| Superimpose | "Photography" Or "Slide" | Data is written on photographed image. |
| Single/Multi | "Slide" | one image is displayed in "single" mode. Plural images are displayed in "multi" mode. |

In the "Delete" mode, a photographed image, displayed at the LCD 12a, is deleted.

In the "Superimpose" mode, data, such as year, month, date, and messages, are written on the photographed still image.

In the "Single" mode, one of the photographed still images is displayed on a full area of the LCD 12a.

In the "Multi" mode, a plurality of photographed still images are simultaneously displayed on the LCD 12a.

Further, it is also possible to manually change the cover-controlled operation modes controlled by the rotary switch 16 using the mode selection dial 17.

Figure 5:
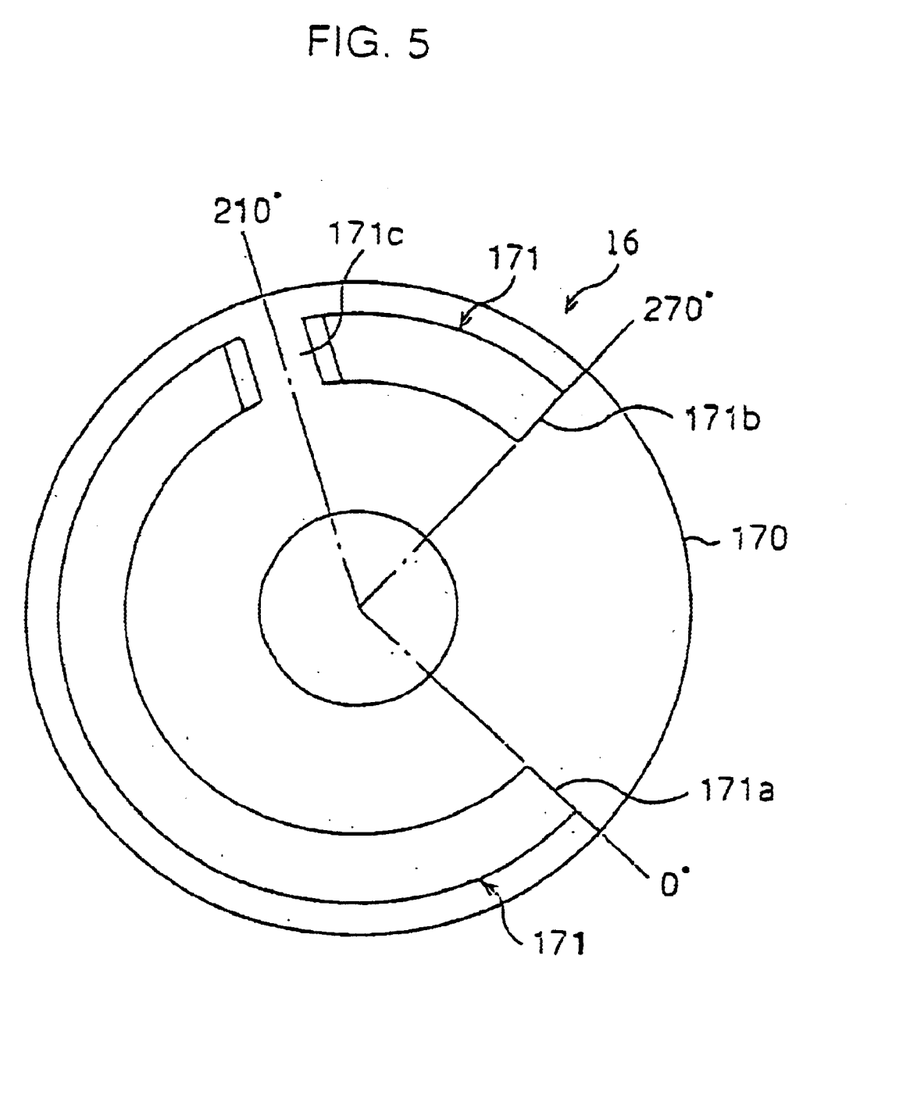
FIG. 5 is a plan view showing a cam plate of a rotary switch of the first embodiment.

In FIG. 5, a cam plate 170, included in the rotary switch 16, is securely connected to and rotates together with the dial 13b. An arcuate circular guide channel 171 is formed on a surface of the cam plate 170, which slidably engages a pin (not shown) for electrically changing the above mentioned cover-controlled operation modes of the digital camera 10. The guide channel 171 starts from an end 171a corresponding to the angle α of 0 deg of the swing cover 13 and terminates at another end 171b corresponding to the angle α of 270 deg. At an intermediate position of the guide channel 171, corresponding to an angle α of 210 deg, a smooth plateau 171c is formed. The pin is pushed by the plateau such that the cover-controlled operation mode is changed from "Photography" to "Slide" or vice versa.

FIG. 6 is a block diagram of the digital camera 10. In the swing cover 13, the optical system 21 is connected to the automatic focusing apparatus 22, and the area sensor (image sensor) 30 on which the image in the visual field is focused by the optical system 21 is provided on an optical axis of the optical system 21. The optical image is converted into analog image-pixel signals by the image sensor 30, amplified by an amplifier 31, and then converted by an A/D converter 32 into digital image-pixel signals. The area sensor 30 is controlled by a sensor driving circuit 33. The automatic focusing apparatus 22 and the sensor driving circuit 33 are controlled by a CPU 40 in the body 11, such that photography is performed when the cover-controlled operation mode is the "Photography" mode and no photography is performed when in the "Slide" mode or "Shutdown" mode.

Output digital image-pixel signals from the A/D converter 32 are input to a digital signal processor (DSP) 41, such that the digital image-pixel signals undergo various image processings, such as a shading compensation and a noise reduction. The processed digital image-pixel signals in the DSP 41 are once stored in an image memory 43 according to a control of a memory controller 42. The processed digital signals stored in the image memory 43 are read by the memory controller 42 from the image memory 43, and encoded by the DSP 41 from red (R), green (G) and blue (B) digital image-pixel signals to a video signal format consisting of color differential signals (Cr, Cb) and a luminance signal (Y). The video signal is input through the CPU 40 to an LCD driving circuit 48 which drives the LCD 12a. Since images are continuously input to the area sensor 30 and transferred to the image memory 43, the image in the visual field is displayed by the LCD 12a as a motion picture in real-time.

The digital image-pixel signals stored in the image memory 43 and a memory 44 can be output from the input/output terminal 19 to a peripheral apparatus. While, image data contained in the peripheral apparatus can be input to the input/output terminal 19 through the DSP 41 to the image memory 43, and is once stored in the image memory 43. The image data in the image memory 43 is then read out of the image memory 43 according to a control by the CPU 40, undergoes predetermined image processing by the DSP 41, and the processed image is displayed on the LCD 12a.

When the shutter button 23 is half-depressed, a single-frame image is held in the image memory 43 and a still image is displayed on the LCD 12a. When the shutter button 23 is further depressed, the photographed still image is stored in the memory 44, which stores photographed still images successively. In the "Slide" mode, the images in the memory 44 can be successively displayed, as previously described.

In the body 11, a battery 46 is disposed for supplying the electric power to the components of the digital camera 10, such as the LCD driving circuit 48, the automatic focusing apparatus 22, the sensor driving circuit 33. The electric power of the battery 46 is supplied through the switch 15 to an electric power control circuit 45, which stabilizes the electric power and controls the electric power supply to the components of the digital camera 10.

Figure 7:
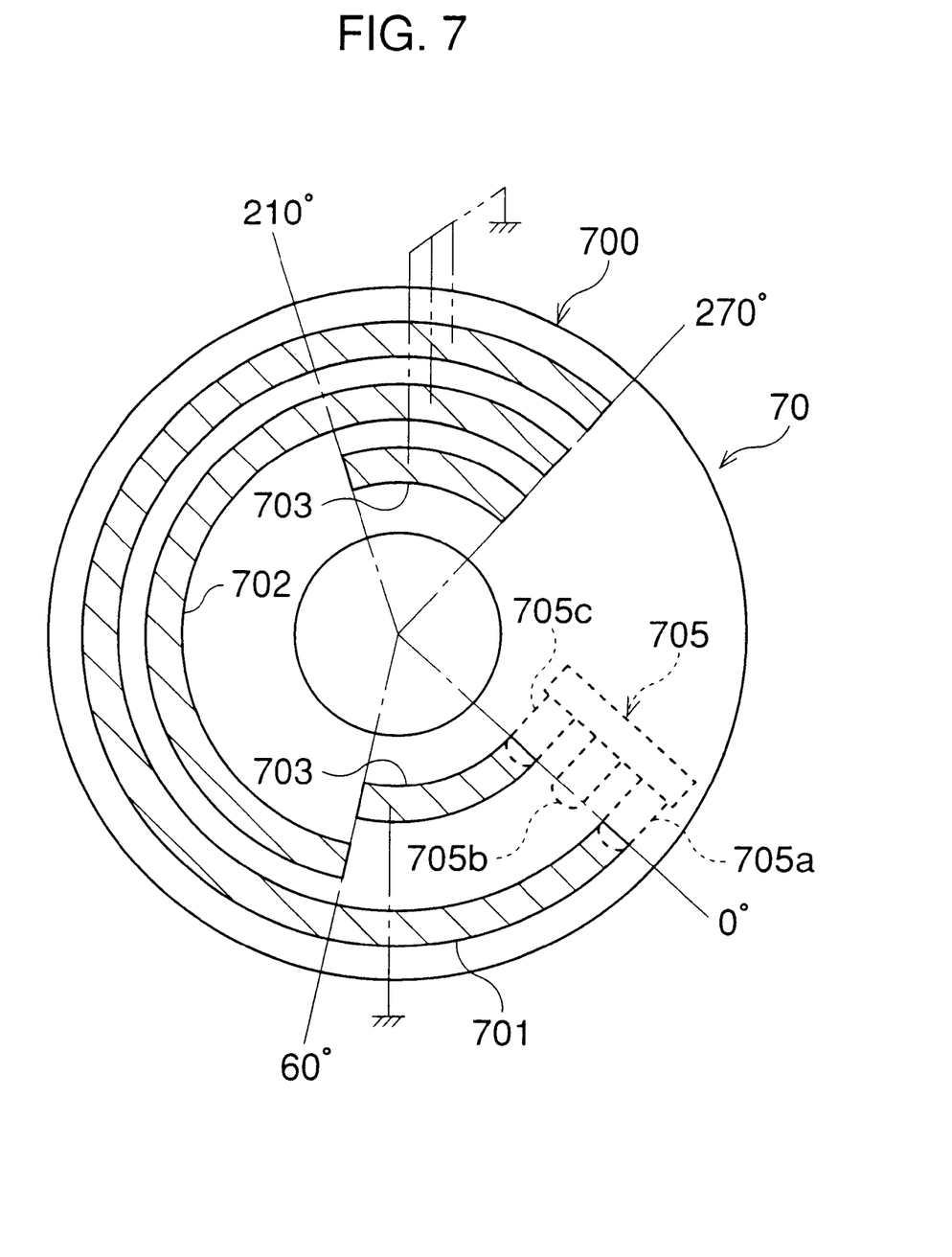
FIG. 7 is a plan view of a cam plate of a rotary switch of a second embodiment according to the present invention.
Figure 8:
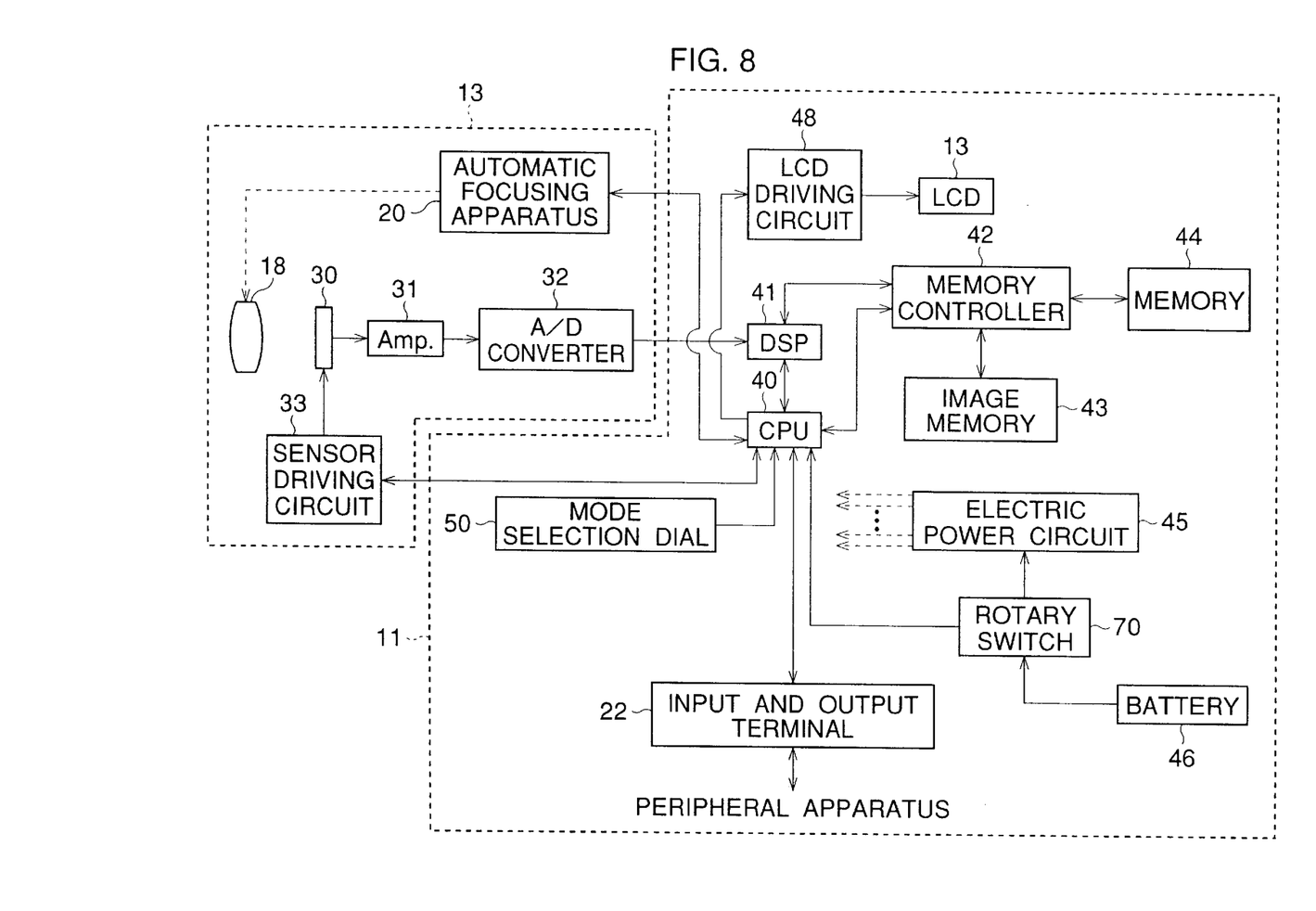
FIG. 8 is block diagram of the second embodiment.

FIG. 7 shows a rotary switch 70 of a second embodiment, and FIG. 8 is a block diagram incorporating the second embodiment. Similar portions to the first embodiment exhibit like references. In the second embodiment, the switch 15 of the first embodiment for turning off the electric power supply is omitted, and the rotary switch 16 is substituted by the rotary switch 70. The rotary switch 70 is connected between the battery 46 and the electric power circuit 45, and to the CPU 40, so as to be used as a main power switch (the switch 15 of the first embodiment) as well as for the angle detection switch (the rotary switch 16 of the first embodiment). Input and output terminals 22 for connection to a peripheral apparatus are shown in FIG. 8 as is a mode selection dial 50. Both the input and output terminal, as well as the mode selection dial are connected to the CPU 40.

The rotary switch 70 includes an electrode plate 700 as shown in FIG. 7, which is securely connected to and rotates together with the dials 13b. Arcuate conductor lines 701, 702 and 703 are formed on a surface of the electrode plate 700, which slidably contact a brush 705. The brush 705 includes terminals 705a, 705b and 705c corresponding to and contacting the electrodes 701, 702 and 703, respectively. The conductor line 701 extends between angular positions of 0 deg and 270 deg, the conductor line 702 extends between angular positions of 60 deg and 270 deg. The conductor line 703 extends between angular positions of 0 deg and 60 deg, and between angular positions of 210 deg and 270 deg. The respective angular positions correspond to the rotation angle of the swing cover 13, similarly to the first embodiment.

The brush 705 is input with a predetermined voltage and the conductor lines 701 to 703 are grounded.

In the angular range between 0 deg and 60 deg, the terminals 705a and 705c are grounded through conductor lines 701 and 703, respectively, and are equal in voltage. While, the terminal 705b is higher than the voltage of the terminals 705a and 705c. Thus, this angular range is detected and the power is turned OFF.

In the angular range between 60 deg and 210 deg, the terminals 705a and 705b are grounded through conductor lines 701 and 702, respectively, and are equal in voltage. While, the terminal 705c is higher than the voltage of the terminals 705a and 705b. Thus, this angular range is detected and the cover-controlled operation mode is set to the "Photography" mode.

In the angular range between 210 deg and 270 deg, all the terminals 705a to 705c are grounded through conductor lines 701 to 703, respectively, and are equal in voltage. Thus, this angular range is detected and the cover-controlled operation mode is set to the "Slide" mode.

Consequently, a similar effect to that of the first embodiment is achieved by the second embodiment.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No.10-130045 (filed on May 13, 1998) which is expressly incorporated herein, by reference, in its entirety.

What is claimed is:

1. A digital camera comprising:

an electrical photography unit that includes an image sensor that converts an optical image to an electrical image, and an optical system that focuses said optical image on an image receiving surface of said image sensor;

a display unit comprising a liquid crystal display (LCD) that displays said electrical image;

a camera body having a front surface in which said display unit is disposed;

a swing cover attached to said camera body, said swing cover rotates between a closed position that covers said LCD and an open position that uncovers said LCD, said electrical photography unit being disposed in said swing cover; and a switch that controls an electrical power supplied to said digital camera such that said electrical power is turned OFF when said swing cover covers said LCD and said power is turned ON when said swing cover uncovers said LCD, said switch comprising a rotary switch that detects an angle of said swing cover such that one of at least three cover-controlled operation modes of said digital camera changes in response to a change in said angle.

2. The digital camera according to claim 1 wherein said swing cover is a rectangular plate having a shape corresponding to a shape of said LCD, said rectangular plate having a back surface that faces said LCD in said closed position and a front surface on which said optical system is mounted.

3. The digital camera of claim 1, wherein said cover-controlled operation mode changes from a "Shutdown" mode, to a "Photography" mode, to a "Slide" mode as said angle increases, said electric power being turned OFF in said "Shutdown" mode, said image being still-photographed in said "Photography" mode, and said photographed still-image being displayed on said LCD in said "Slide" mode.

4. The digital camera of claim 3, wherein said rotary switch includes:
   an electrode plate having a plurality of arcuate conductor lines; and
   a brush having a plurality of terminals corresponding to said arcuate conductor lines each of said terminals contacts a corresponding conductor line in a predetermined angle in response to said angle such that said angle is electrically detected and said cover-controlled operation mode is accordingly changed.

5. The digital camera of claim 1, wherein said cover-controlled operation mode changes from a "Photography" mode to a "Slide" mode, as said angle increases, said image being still-photographed in said "Photography" mode, and said photographed still-image being displayed on said LCD in said "Slide" mode.

6. The digital camera according to claim 1, said rotary switch being positioned about a swing axis of said cover.

7. A digital camera comprising:
   an electrical photography unit that includes an image sensor that converts an optical image to an electrical image, and an optical system that focuses said optical image on an image receiving surface of said image sensor;
   a display unit comprising a liquid crystal display (LCD) that displays said electrical image;
   a camera body having a front surface in which said display unit is disposed;
   a swing cover attached to said camera body, said swing cover rotates between a closed position that covers said LCD and an open position that uncovers said LCD, said electrical photography unit being disposed in said swing cover; and
   a switch that controls an electrical power supplied to said digital camera such that said electrical power is turned OFF when said swing cover covers said LCD and said electrical power is turned ON when said swing cover uncovers said LCD said switch being operated by said swing cover covering and uncovering said LCD, said switch comprising a rotary switch that detects an angle of said swing cover such that one of at least three cover-controlled operation modes of said digital camera changes in response to a change in said angle.

8. The digital camera according to claim 7, said rotary switch being positioned about a swing axis of said cover.

9. The digital camera according to claim 7, wherein said swing cover is a rectangular plate having a shape corresponding to a shape of said LCD, said rectangular plate having a back surface that faces said LCD in said closed position and a front surface on which said optical system is mounted.

10. A digital camera comprising:
    an electrical photography unit that includes an image sensor that converts an optical image to an electrical image, and an optical system that focuses said optical image on an image receiving surface of said image sensor;
    a display unit comprising a liquid crystal display (LCD) that displays said electrical image;
    a camera body having a front surface in which said display unit is disposed;
    a swing cover attached to said camera body, said swing cover rotates between a closed position that covers said LCD and an open position that uncovers said LCD, said electrical photography unit being disposed in said swing cover; and
    a rotary switch that switches an electrical power supplied to said digital camera such that said power is turned OFF when said swing cover covers said LCD and said power is turned ON when said swing cover uncovers said LCD, said rotary switch comprising a cam plate having an arcuate guide channel slidably engaging a pin that electrically changes said cover-controlled operation mode, a smooth plateau being provided at an intermediate position of said guide channel between a first mode, being one of a "Photography" mode and a "Slide" mode, and a second mode being the other of said "Photography" mode and said "Slide" mode.

11. The digital camera according to claim 10, said rotary switch being positioned about a swing axis of said cover.

12. The digital camera according to claim 10, said rotary switch defining at least three cover-controlled operation modes of said digital camera.

13. The digital camera according to claim 10, wherein said swing cover is a rectangular plate having a shape corresponding to a shape of said LCD, said rectangular plate having a back surface that faces said LCD in said closed position and a front surface on which said optical system is mounted.

* * * * *